Dec. 8, 1964  J. WINKEL ETAL  3,159,960
IMPLEMENTS FOR WORKING CROP OR LIKE
MATERIAL LYING ON THE GROUND
Filed Nov. 25, 1960  3 Sheets-Sheet 1
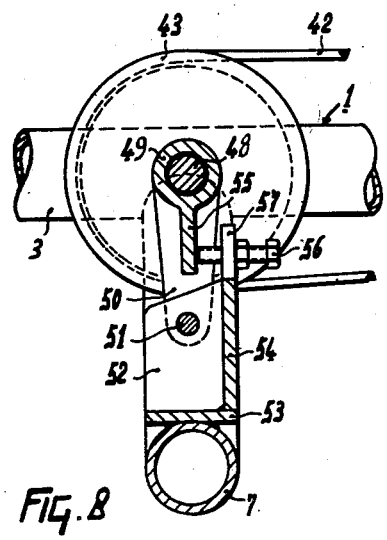
Fig. 8
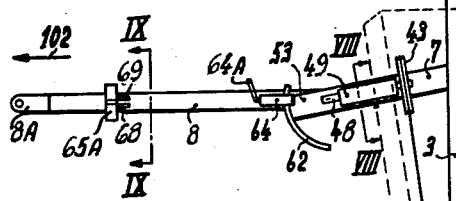
Fig. 1
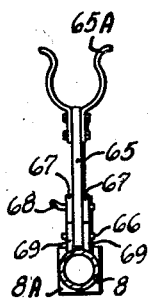
Fig. 9
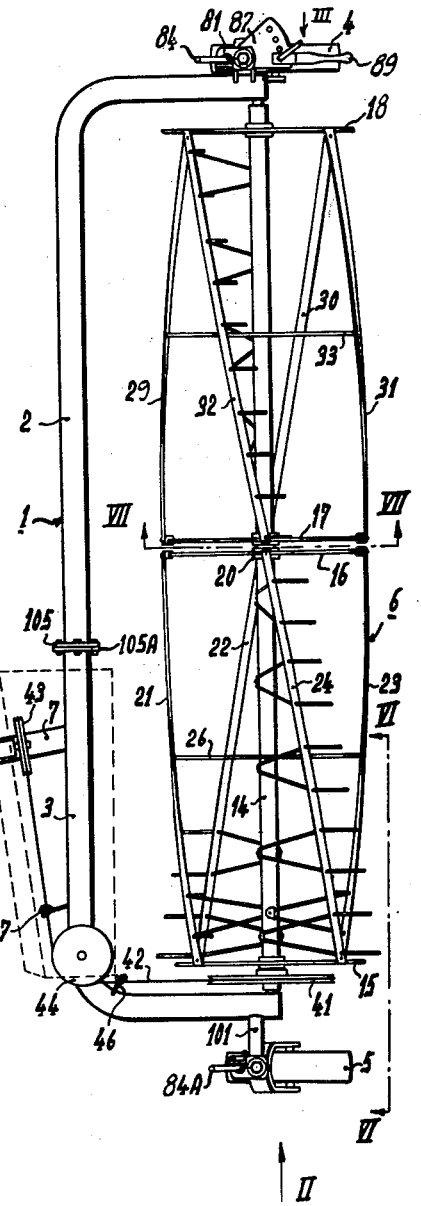
JAN WINKEL
CORNELIS VAN DER LELY
  INVENTORS
BY
Mason, Mason & Albright
  ATTORNEYS

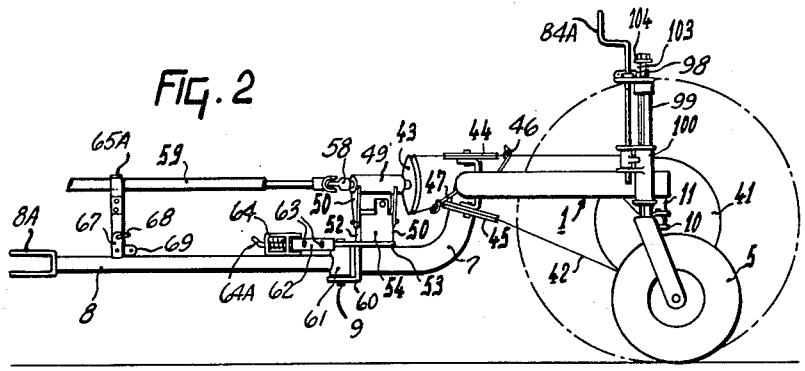
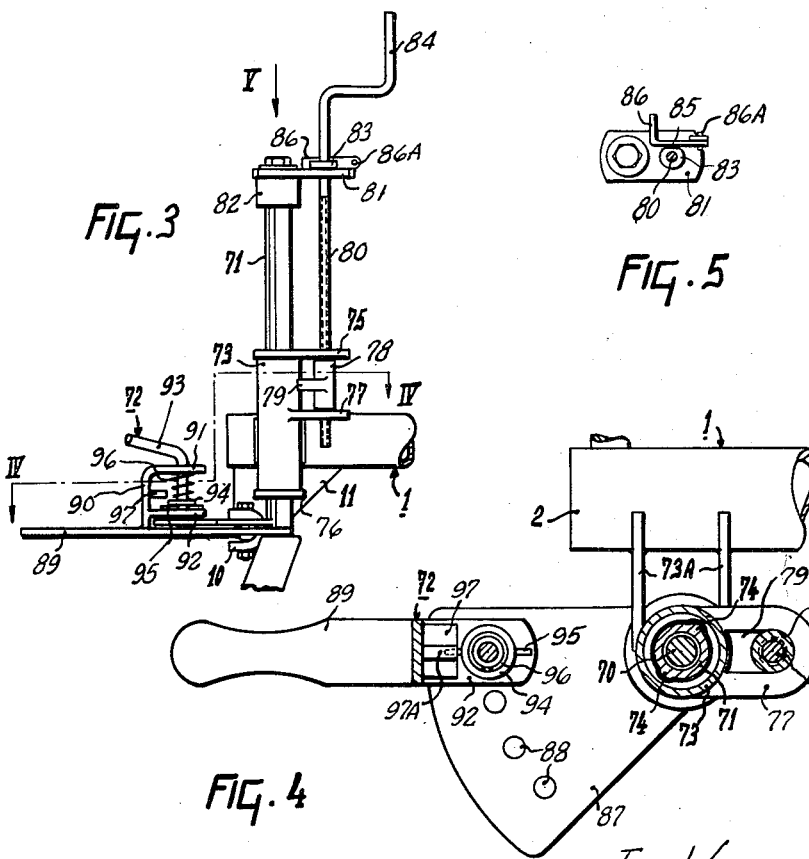

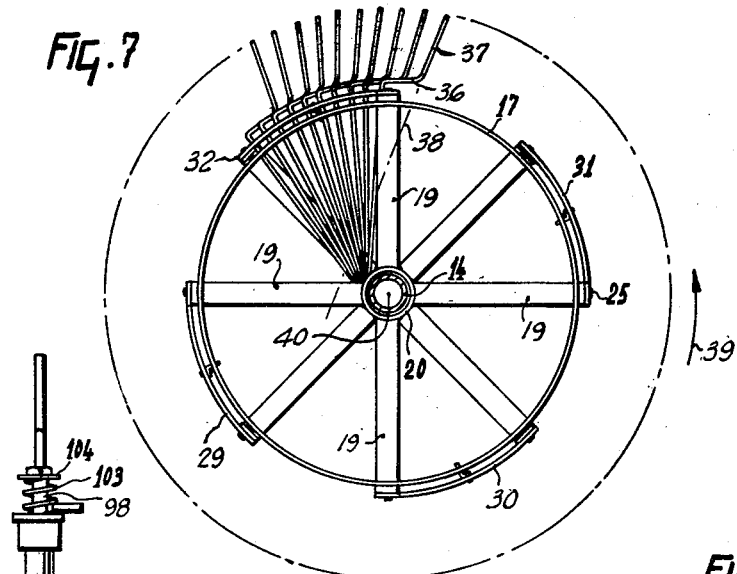
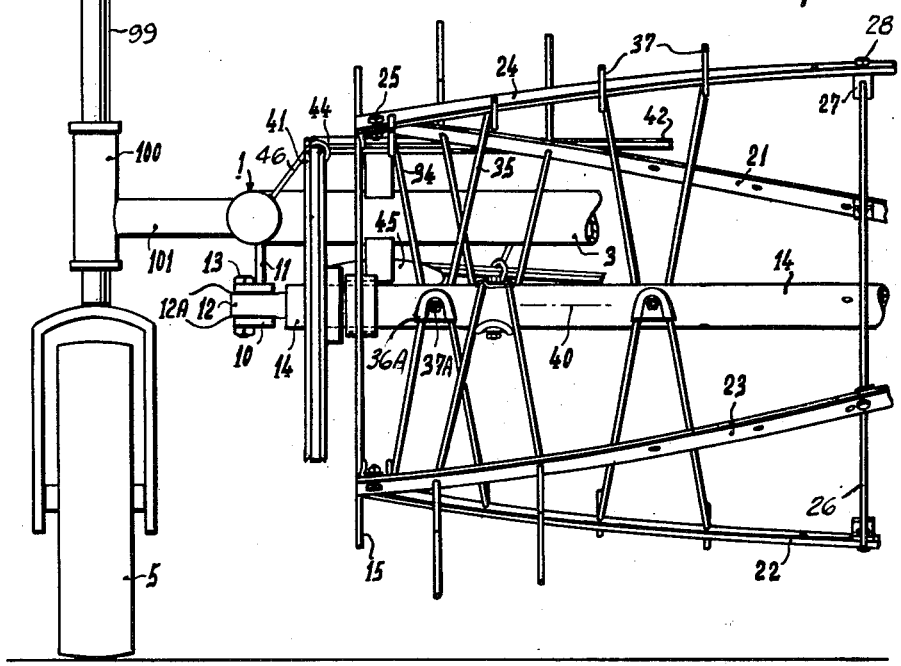

United States Patent Office 3,159,960
Patented Dec. 8, 1964

3,159,960
IMPLEMENTS FOR WORKING CROP OR LIKE
MATERIAL LYING ON THE GROUND
Jan Winkel, Nieuw-Vennep, Netherlands, and Cornelis van der Lely, 7 Bruschrain, Zug, Switzerland; said Winkel assignor to C. van der Lely N.V., Maasland, Netherlands, a company of the Netherlands
Filed Nov. 25, 1960, Ser. No. 71,498
Claims priority, application Netherlands Nov. 28, 1959
15 Claims. (Cl. 56—372)

This invention relates to implements for working crop or like material lying on the ground and has, as an object, to provide an implement which will ted hay and the like in an efficient manner.

According to the invention, there is provided an implement for working crop or like material lying on the ground comprising a frame movable over the ground and a crop-working member rotatably mounted on the frame, the crop-working member being provided with at least one row of tines spaced apart from one another in a direction parallel to the axis of rotation afforded by its mounting on the implement and the arrangement being such that, viewed in a direction parallel to said axis of rotation, a line joining the tip of each tine to the axis is inclined to similar lines joining the tips of the other tines in the same row to the axis.

According to the present invention, there is provided a tedder comprising a frame movable over the ground and a crop-working member rotatably mounted on the frame about an axis extending transversely of the intended direction of travel, the member being adapted to be rotated by means including a non-positive transmission and being provided with at least one row of tines spaced apart from one another in a direction parallel to the said axis of rotation, the, or each, row of tines being arranged substantially helically with respect to the axis of rotation in such a way that, during operation of the tedder, at least one tine is always disposed in a lower region of the crop-working member within which region it encounters any crop lying in its path.

The term "non-positive transmission" is to be interpreted as meaning transmission of the belt or rope and pulley type which will slip upon a predetermined resistance to rotation being exceeded, in contrast to transmissions of the chain and sprocket or gear type.

For a better understanding of the invention, and to show how the same may be carried into effect, reference will now be made, by way of example, to the accompanying drawings, in which:

FIGURE 1 is a plan view of an implement in accordance with the invention,

FIGURE 2 is a side elevational view taken in the direction of the arrow II of FIGURE 1, FIGURE 3 is a side elevational view, to an enlarged scale, taken in the direction of the arrow III of FIGURE 1 and showing a detail of the implement, FIGURE 4 is a section taken on the line IV—IV of FIGURE 3, FIGURE 5 is a view taken in the direction of the arrow V of FIGURE 3, FIGURE 6 is a view, to an enlarged scale, taken along the line VI—VI of FIGURE 1, FIGURE 7 is a section, to an enlarged scale, taken on the line VII—VII of FIGURE 1, FIGURE 8 is a section, to an enlarged scale, taken on the line VIII—VIII of FIGURE 1, and FIGURE 9 is a section, to an enlarged scale, taken on the line IX—IX of FIGURE 1.

Referring to the drawings, the implement comprises a U-shaped (in plan view) frame 1 which is constituted by frame beams 2 and 3. The frame beam 2 has a flange 105 at one end and the frame beam 3 is similarly provided with a flange 105A, the two flanges being rigidly secured to one another by means of bolts and the junction between the two frame beams 2 and 3 lying at a point between the uprights of the aforementioned U.

The frame beam 2 affording one limb of the U is supported by a ground-engaging caster wheel 4 and the other limb of the U, afforded by the frame beam 3, is supported by a ground-engaging caster wheel 5. The ground wheel 4 is angularly adjustable about an axis afforded by a vertical shaft 70 (see FIGURE 4), the shaft 70 being rotatably journalled in a vertical bearing 71. The bearing 71 is axially slidable within a vertical sleeve 73 rigidly secured to the frame beam 2 by means of a pair of lugs 73A, rotation of the bearing 71 relative to the sleeve 73 being prevented by two axially extending ridges 74 formed on the outer surface of the bearing 71 which co-operate with similarly shaped recesses formed in plates 75 and 76 rigidly secured to the upper and lower ends of the sleeve 73 respectively. The plate 75 projects laterally of the sleeve 73 in a similar manner to a lug 77 rigid with the sleeve 73 and projecting therefrom at a location below the plate 75. A member 78 is disposed between the plate 75 and the lug 77 and has a vertically extending screw-threaded bore which receives the correspondingly screw-threaded shank 80 of a crank 84, the said shank 80 also passing through holes in the plate 75, the lug 77 and a further plate 81 secured to a sleeve 82 rigidly mounted at the upper end of the bearing 71. The member 78 has an arm 79 whose free end is of concave shape. The said concave end engages the cylindrical outer surface of the sleeve 73 in such a way that rotation of the member 78 about the shank 80 is prevented. A collar 83 is secured to the crank 84 in such a position that it lies against the upper surface of the plate 81, the collar 83 being formed with a flat portion 85 (see FIGURE 5). A stop 86 is turnably mounted on the plate 81 by means of a horizontal pivot pin 86A whose axis is perpendicular to the shank 80 and, when occupying the position shown in FIGURES 3 and 5, prevents rotation of the collar 83 and thus of the crank 84.

The setting of the shaft 70 relative to the bearing 71 can be adjusted by means of a locking mechanism generally indicated by the reference numeral 72. The locking mechanism 72 includes a sector plate 87 rigid with with the bearing 71 and having an arcuate row of holes 88 formed therein, the center of curvature of the arc being afforded by the shaft 70. An arm 89 is rigid with the said shaft 70 and carries a forked bracket 90 through holes in the upper and lower guide arms 91 and 92 of which a locking pin 93 is passed. A compression spring 96 is coiled around the shank of the locking pin 93 and bears between the upper arm 91 and a collar 94 rigid with the pin 93 in such a way that the pin 93 is urged axially downwardly in FIGURE 3 into engagement with the upper surface of the plate 87 or into a selected one of the holes 88. A projection in the form of a horizontal pin 95 is lodged in a transverse bore in the shank of the locking pin 93 below the collar 94 and can be used to retain the said locking pin 93 in an inoperative withdrawn position. The inoperative position is reached by twisting the pin 93 and withdrawing it against the action of the spring 96 until such time as the pin 95 is disposed above a ledge 97 projecting from an upright part of the bracket 90 after which, upon twisting the locking pin 93 back about its longitudinal axis, one end of the pin 95 can be lodged in a horizontal groove 97A formed in the upper face of the ledge 97.

The ground wheel 5 is angularly adjustable about a vertical shaft 98 (see FIGURE 2) which is rotatably journalled in a bearing 99, the bearing 99 being axially slidable in a sleeve 100. The bearing 99 is prevented from rotating relative to the sleeve 100 in a similar manner to that described in connection with the parts 71 and 73 and a crank 84A is arranged in a similar manner to the crank 84. However, no locking mechanism corresponding to the mechanism 72 previously described is provided in respect of the ground wheel 5 so that the latter always acts as a caster wheel. In order to ensure that the plane of rotation of the ground wheel 5 shall not be too freely turnable about the shaft 98, a compression spring 103 is coiled around the upper end of the shaft 98 and bears between a washer 104 and the uppermost end of the bearing 99.

A crop-working member generally indicated by the reference numeral 6 is disposed between the two limbs of the U of the frame 1 and is secured to these limbs by means of two pairs of forked bearings 10, which are connected with the beams 2 and 3 respectively by means of plates 11. A stub shaft 12 is received within each of the bearings 10, each stub shaft being formed with flats 12A (see FIGURE 6) which co-operate with the corresponding bearing 10 in such a way as to prevent rotation of the shaft 12 relative thereto. The shafts 12 are, in fact, secured in position relative to the corresponding bearings 10 by bolts 13 passed through holes in the two arms of the bearings 10 and through an aligned transverse bore in each of the shafts 12. The two stub shafts 12 are co-axial with one another and parallel with the base of the U of the frame 1 and each extends over a short distance towards the other between the two arms of the U at a level lower than that of the said frame 1.

A tubular shaft 14 is rotatably journalled on the two stub shafts 12 and has rotatably mounted thereon four rings 15, 16, 17 and 18, each ring being connected to a bearing 20 by means of four radial spokes 19 which are welded to the said bearing 20 and to the corresponding ring (see FIGURE 7). Each bearing 20 is freely turnable around the tubular shaft 14 and the spokes 19 which radiate therefrom extend radially beyond the corresponding one of the rings 15, 16, 17 and 18, the spokes being bent over through approximately 90° at their free ends and the said bent over portions having supporting elements secured to them by means of bolts 25, the supporting elements being constituted by resilient strips.

FIGURE 6 shows the connection of four strips 21, 22, 23 and 24 to the four spokes 19 which support the ring 15 mounted at one end of the shaft 14.

Each of the strips 21 to 24 is connected at a location substantially midway along its length to a ring 26 by means of a bent plate 27 and a bolt 28. The ring 26 merely acts as a supporting end strengthening member and is not directly connected with the shaft 14. The points of connection of the strips 21 to 24 to the ring 15 are spaced apart from one another at 90° intervals around the shaft 14 and each strip is so disposed that the point of connection of its opposite end to the ring 16 is turned through 45° about the said shaft 14 with respect to the point of connection to the ring 15. Four strips 29, 30, 31 and 32 are arranged in a similar manner between the rings 17 and 18 and each of them is secured to a further ring 33, corresponding to the ring 26 previously described, at a point substantially midway along its length. The points of connection of the strips 21 to 24 to the ring 16 are so disposed relative to the points of connection of the strips 29 to 32 to the ring 17 that each of the first set of strips lies in line with a corresponding one of the second set of strips (seen FIGURE 1).

A plurality of integral pairs of spring steel tines are secured in rows to the shaft 14 by means of holders 36A and bolts 37A, the bolts 37A passing through transverse holes in the shaft 14 in such a way that each such bolt secures two pairs of tines in position, the two pairs being 180° removed from one another around the shaft 14. Each pair of tines comprises two oppositely inclined root or spoke portions 34 and 35 (see FIGURE 6) which pass through holes in one of the strips, beyond which strip they are each bent through 90° to form a support portion 36, a crop-working portion 37 being connected with each support portion 36 by way of a further bend of approximately 110°. The crop-working portions 37 of the tines are not disposed radially with respect to the longitudinal axis 40 of the shaft 14 but are so shaped and mounted that the center-line 38 (see FIGURE 7) of each portion 37 is tangential to a circle whose center lies on the axis 40 and whose radius is approximately one sixth of the perpendicular distance between the extreme tip of each portion 37 and the axis 40. As can be seen in FIGURE 7, each crop-working portion 37 is slightly inclined to the rear with respect to the intended direction of rotation 39 of the whole crop-working member 6 whereas each portion 36 projects forwardly of the corresponding portion 37 relative to the said direction of rotation 39.

Each crop-working portion 37 and each corresponding supporting portion 36 lie in a plane perpendicular to the longitudinal axis 40, the said plane including two such portions 37 corresponding to diametrically opposite strips, such as the strips 22 and 24 shown in FIGURE 6. As can be seen in FIGURE 6 two co-planar portions 37 of two tines corresponding to the other two strips 21 and 23 lie in a plane disposed substantially midway between two planes including portions 37 corresponding to the strips 22 and 24. Thus, when viewed in a direction perpendicular to the longitudinal axis 40, the portions 37 are spaced along the crop-working member 6 at distances apart from one another which are half the distance between the two portions 37 of any one integral pair of tines.

As can be seen in FIGURE 1, the crop-working member 6 is formed from two approximately cylindrical-shaped cages, one cage having the rings 15 and 16 at its opposite ends and the other the rings 17 and 18 and each cage having four rows of ten tines. Each row of tines subtends an angle of approximately 45° at the axis 40 when viewed in a direction parallel to that axis. Each of the two cages is movable independently of the other within the limits of the resiliency of the root portions 34 and 35 of the tines which interconnect the various strips with the shaft 14.

Owing to the resilient construction of the tines and the various strips, the crop-working portion 37 of each tine can deflect substantially to match undulations in the ground surface when the implement is in operation. It will be appreciated from FIGURES 1 and 7 that, viewed in a direction parallel to the axis 40, the eighty tines are equidistantly spaced from one another throughout the 360° around that axis. However, the inclination of the various strips 21 to 24 and 29 to 32 may be altered in such a way that each helical row of twenty tines which extends from the ring 15 to the ring 18 may subtend an angle of substantially more than 90° at the axis 40. Furthermore, the number of rows of tines may be increased or decreased, the number of cages may be greater than two, and means may be provided for controlling the speed of rotation of the shaft 14.

A pulley 41 is rigidly mounted at one end of the shaft 14 and is coupled, via a rope 42, with a further pulley 43 mounted above a beam 7 secured to the frame beam 3, the rope 42 preferably having a V-section. The rope 42 passes around guide pulleys 44 and 45 (see FIGURE 2) mounted at or near the junction between the base and one of the limbs of the U-shaped frame 1 and through guide loops 46 and 47 adapted to prevent disengagement of the rope from the grooves of the two pulleys 44 and 45. If desired, a belt drive and correspondingly shaped pulleys may be substituted for the rope 42 and pulleys 41, 43, 44 and 45. The drive is preferably of a kind capable of slipping in order to prevent damage to the transmission in the event of the member 6 becoming jammed. The pulley 43 is mounted on a shaft 48 which is substantially perpendicular to the axis 40 and which is journalled in a horizontal bearing 49, the bearing 49 having two arms 50 rigidly secured thereto and the free ends of the two arms 50 being turnable about a horizontal pivot pin 51 (FIGURE 8). The pivot pin 51 is carried by two vertical lugs 52 welded to a horizontal plate 53 which, in turn, is welded to the beam 7. A plate 54 extends perpendicularly between the two lugs 52 and is formed with an upwardly extending projection 57 having a transverse screw-threaded hole formed therein within which hole an adjusting bolt 56 is received. The shank of the bolt 56 bears against a downwardly projecting lug 55 rigid with the bearing 49 so that, by suitable adjustment of the bolt 56, the tension in the rope 42, or corresponding belt, can be raised or lowered.

The free end of the shaft 48 is provided with a universal joint 58 (see FIGURE 2) to which is connected a transmission shaft 59 adapted to be coupled to the power take-off shaft of a tractor or like vehicle which is to be used for moving the implement over the ground. The parts 58 and 59 are omitted in FIGURE 1 for the sake of clarity and may, if desired, be replaced by a transmission of the flexible type.

A vertical pivot pin 9 is mounted at the leading end of the beam 7 between the aforementioned horizontal plate 53 and a further horizontal plate 60. A vertical bearing 61 is turnable about the pivot pin 9 between the two plates 53 and 60 and has rigidly secured thereto a draw-bar 8 which projects forwardly of the implement and which is provided with a fork 8A at its leading end by means of which the implement can be coupled to a tractor or like vehicle. The plate 53 carries a curved strip 62 having its centre of curvature afforded by the pivot pin 9 and the draw bar 8 carries a bracket 64 in which bracket a spring-loaded locking pin 64A is supported. The strip 62 is formed with a plurality of holes 63 into any one of which the tip of the locking pin 64A can engage thereby securing the draw bar 8 in a corresponding angular setting relative to the frame 1 of the implement.

The upper side of the draw bar 8 has two vertically extending lugs 67 secured thereto and two horizontally extending lugs 69 also secured thereto, an arm 65 being turnable between the two pairs of lugs 67 and 69 about a horizontal pivot pin 66. The arm 65 is formed with a hole which can be brought into alignment with holes in the lugs 67, in which case the arm 65 extends substantially vertically, or alternatively, into alignment with holes in the lugs 69, in which case the arm 65 lies substantially horizontally along the upper surface of the draw bar 8. A locking pin 68 is provided to retain the arm 65 in either of the two positions just described. The free end of the arm 65 carries a cradle 65A which, when the arm 65 is in its vertical position, is adapted to support the transmission shaft 59 shown in FIGURE 2 when the latter is not in use.

During operation, the implement is coupled to a tractor or like vehicle by means of the fork 8A and the crop-working member 6 is rotated in the direction 39 (FIGURE 7) by connecting the transmission shaft 59 to the power take-off shaft of the said tractor or like vehicle, the said arm 65 being secured in its horizontal position at such time. Upon moving the implement in the direction indicated by the arrow 102 in FIGURE 1, the lower region of the crop-working member 6 will move in the opposite direction sweeping crop such as hay or the like to the rear of the implement in such a way that the crop is left dispersed on the ground in a manner conducive to the drying thereof. The pressure exerted by the portions 37 on the ground in the said lower region, or the amount by which they clear the ground, is set by suitable adjustment of the cranks 84 and 84A, the stops 86 being used to retain the cranks in the settings selected. The rows of tines are arranged in such a way that at least one tine is always disposed in the said lower region, whereby "snatching" of the drive to the member 6, which would tend to cause slipping of the rope or the like 42, is substantially avoided.

When the axis 40 of the crop-working member 6 is disposed at 90° to the direction of travel 102, as shown in FIGURE 1, the implement is adapted to function as a tedder. However, the axis 40 can be disposed at an angle of other than 90° to the direction of travel 102 by altering the setting of the plane of rotation of the ground wheel 4. The draw bar 8 is, preferably, also brought to a similar setting to the ground wheel 4 by engaging the locking pin 64A in a suitable one of the holes 63. In certain circumstances, the implement effects a better tedding action with the axis 40 inclined to the direction 102 in the manner just described. The implement may also be used in this position for the spreading of swaths.

The ground wheel 4 and draw bar 8 may be secured in settings which are such that the axis 40 is inclined at only a small angle to the direction 102. This facilitates the movement of the implement from one place to the other at times when it is not performing any working operation since the overall width of the implement is substantially reduced when adjusted in the manner just described. This reduces the likelihood of the implement fouling gateways and the like. The cranks 84 and 84A will, of course, be adjusted in such a way that the working member 6 is raised as far as possible above the ground during movement of the implement from place to place.

By constructing the frame 1 in two parts, the assembly and disassembly of the implement is facilitated, and its overall volume is substantially reduced when it is dismantled for storage or transport.

Although the member 6 has been described as being adapted to be rotated by power derived from a tractor or like vehicle, the member 6 may, in fact, be rotated by any conventional source of power.

What we claim is:

1. A tedder comprising a frame supported by ground wheels and a crop-working member rotatably mounted on said frame, said crop-working member being rotatable about a substantially transverse axis, said wheels having their axes of rotation located lower than and in substantially the same vertical plane as said axis, said member being provided with at least one row of resilient tines supported on a strip, said strip being helically disposed and retained in spaced relationship around said axis by a plurality of intervening spokes, said tines being spaced from one another in a direction parallel to said axis, and having their crop-working portions inclined to the rear with respect to the intended direction of rotation.

2. The invention of claim 1 wherein the crop-working portions of said tines are connected to support portions that project forwardly of said first named portions.

3. The invention of claim 1 wherein the axis is afforded by a shaft, said tines connecting said shaft and said strip to form a supporting cage.

4. The invention of claim 1 wherein the axis is afforded by a shaft, a plurality of rows of tines supported on a plurality of strips, said tines connecting said shaft to said strips to form more than one supporting cage.

5. A tedder comprising a frame supported by ground wheels and a crop-working member rotatably mounted on said frame, said crop-working member being rotatable about a substantially transverse axis, said wheels having their axes of rotation located lower than and in substantially the same vertical plane as said axis, said member being provided with at least one row of resilient tines supported on a strip, said strip being helically disposed and retained in spaced relationship around said axis by a plurality of intervening spokes, said tines being spaced from one another in a direction parallel to said axis, and having their crop-working portions inclined to the rear with respect to the intended direction of rotation of the crop-working member whereby the center lines of said portions are tangential to a circle having said axis at the center thereof.

6. The invention of claim 5 wherein a plurality of rows of resilient tines are supported on a plurality of strips.

7. The invention of claim 6 wherein said strips are connected at their opposite ends to rings, said rings being connected to bearings and said bearings being rotatable about said axis.

8. The invention of claim 6 wherein the crop-working portions of said tines are connected to support portions that project forwardly of said first named portions.

9. The invention of claim 8 wherein said tines have root portions that extend radially from said axis to form joints with said support portions, said root portions engaging said strips adjacent said joints.

10. The invention of claim 9 wherein the axis is afforded by a shaft, said tines being secured to said shaft.

11. The invention of claim 10 wherein said tines are formed in pairs and two of said pairs are secured to the shaft in offset relationship by the same retaining means.

12. A tedder comprising a frame supported by ground wheels and a crop-working member rotatably mounted on said frame, said crop-working member being rotatable about a substantially transverse axis, said wheels having their axes of rotation located lower than and in substantially the same vertical plane as said axis, said member being provided with a plurality of rows of resilient tines supported on a plurality of strips, said strips being helically disposed and retained in spaced relationship around said axis by a plurality of intervening spokes, said tines being spaced from one another in a direction parallel to said axis, said tines in succeeding rows being offset with respect to one another in a direction parallel to said axis and having their crop-working portions inclined to the rear with respect to the intended direction of rotation of the crop-working member.

13. The invention of claim 12 wherein said tines are offset with respect to one another by a distance approximately half the distance between neighboring tines in the same row.

14. The invention of claim 12 wherein said axis is afforded by a shaft and said tines have root portions connecting said strips to said shaft to form more than one supporting cage.

15. The invention of claim 14 wherein each of said strips subtend an angle of about 90° when viewed in a direction parallel to the axis.

References Cited in the file of this patent

UNITED STATES PATENTS

| | | |
|---|---|---|
| 311,991 | Keller | Feb. 10, 1885 |
| 828,571 | Rodemeyer | Aug. 14, 1906 |
| 1,049,823 | Dillon | Jan. 7, 1913 |
| 2,201,318 | Neidhart | May 21, 1940 |
| 2,810,253 | Moore | Oct. 22, 1957 |
| 2,860,478 | Van der Lely et al. | Nov. 18, 1958 |
| 2,953,891 | Van der Lely et al. | Sept. 27, 1960 |

FOREIGN PATENTS

| | | |
|---|---|---|
| 4,485 | Great Britain | Mar. 6, 1884 |